2 Sheets

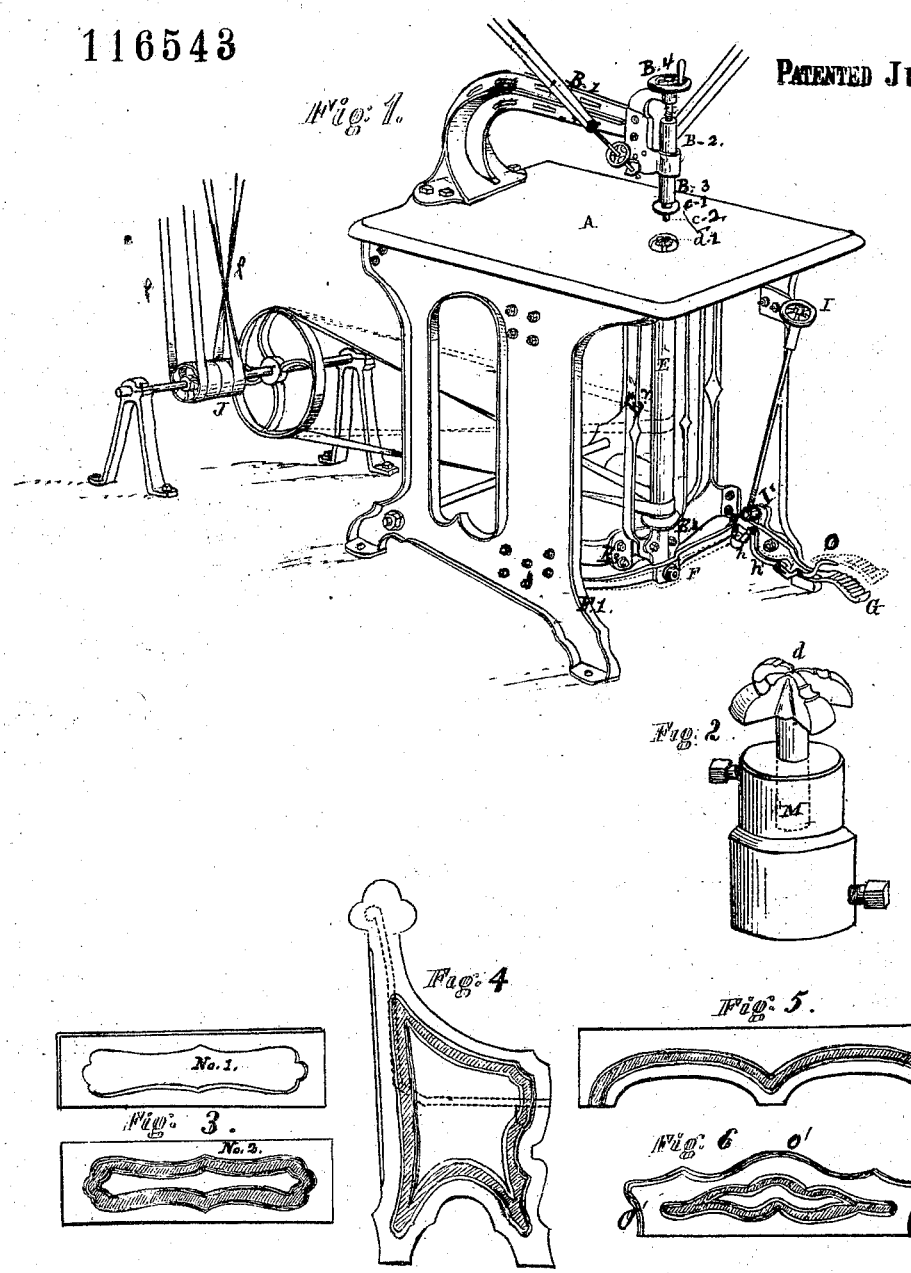

M. T. Boult's Bracket Moulder.

Witnesses.
L. S. Mabee
O. D. Munn

Inventor
M. T. Boult
per Munn & Co.
Attorneys

UNITED STATES PATENT OFFICE.

MYRON T. BOULT, OF BATTLE CREEK, MICHIGAN.

IMPROVEMENT IN MACHINES FOR CARVING AND MOLDING WOOD.

Specification forming part of Letters Patent No. 116,543, dated July 4, 1871.

*To all whom it may concern:*

Be it known that I, MYRON T. BOULT, of Battle Creek, in the county of Calhoun and State of Michigan, have invented a new and Improved Machine for Carving and Molding Wood; and I do hereby declare that the following is a full, clear, and exact description thereof, which will enable others skilled in the art to make and use the same, reference being had to the accompanying drawing forming part of this specification, in which—

Figure 7:
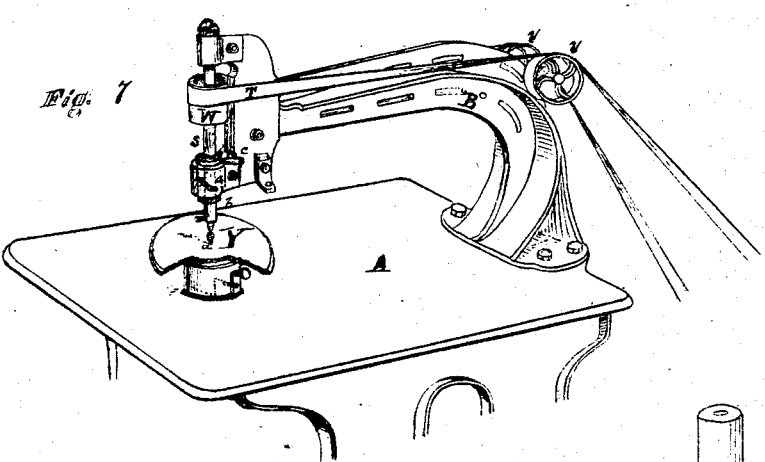
Figure 10:
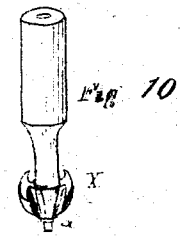
Figure 8:
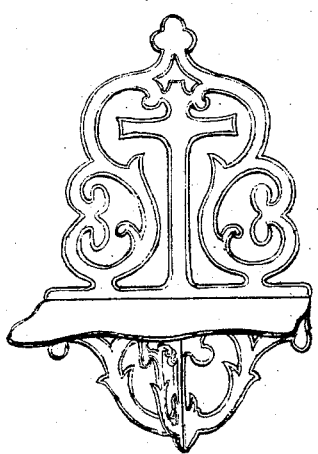
Figure 9:
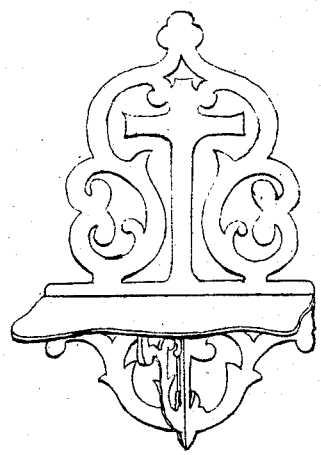

Figure 1 represents a perspective view of my improved carving and molding-machine. Fig. 2 is a side view of a cutter for entering the surface of lumber and cutting moldings thereto. Fig. 3 is a plan view of the pattern for molding, and of the piece of wood molded on my machine. Figs. 4, 5, and 6 are further plan or face views of articles molded on my machine. Fig. 7 is a perspective view of the upper part of the machine, showing it adapted for molding brackets, scroll and fret-work. Figs. 8 and 9 are perspective views, respectively, of brackets after and before being molded. Fig. 10 is a detail side view of a cutter used for molding brackets and edge-molding.

Similar letters of reference indicate corresponding parts.

This invention relates to a new machine for molding the edges of flat or other wood-work, both solid and perforated, and also for forming projecting or receding molded panels on the faces or planes of wooden articles. The invention is consequently not only useful for molding the edges of boards, brackets, &c., but also for preparing the surfaces of articles of furniture, musical instruments, vehicles, doors, &c. The accuracy of every kind of work performed on this machine is insured in every case by the use of patterns, by means of which the employment of inexperienced hands for executing highly artistic or complicated work becomes permissible. The invention consists in several new features of mechanism and novel kinds of cutter, as hereinafter more fully described.

A in the drawing represents the bed or table of my machine, being made of metal or other suitable material. B is an arched arm projecting from said table, and arranged to support the guide-head $B^2$. In the guide-head is arranged a vertical tube, $B^3$, which is connected with a screw, $B^4$, whereby it can, with its appendages, be adjusted up or down at will. Into the lower end of the tube $B^3$ is inserted the shank of the guide and presser-plate $C^1$, on which rests a spiral or other spring, not shown, for holding it down upon the pattern-plate and allowing it to yield to inequalities of surface. A center pin, $C^2$, projects from the center of the disk or plate $C^1$ to serve as a guide for the pattern. E is a vertical spindle hung in vertically-adjustable frame $E^2$, which is guided in suitable vertical grooves or channels that are provided on the stationary frame A. The lower end of the frame $E^2$ is connected with and supported by a transverse lever, F, which is, by a link, connected with a foot-lever or treadle, G. This treadle is pivoted to the frame A by the same pin, which also secures to said frame a pivoted plate, I', carrying a projecting stop, $h'$. To the lever G is also pivoted a spring-pawl, $h$, connected with a lever, O. When the lever G is swung so as to raise, by the lever F, the frame $E^2$ and spindle E, the pawl $h$ will catch over the stop $h'$ and lock the spindle in the desired elevated position. When, by pressing upon the lever O, the pawl is released from the stop, the spindle will again drop. The swinging plate I' is connected with a screw, I, by which the height of the stop $h'$ is regulated, so that the spindle may be raised to a desired height to bring the cutter on its upper end any suitable distance from the guide-pin $C^2$ that projects from the lower end of the plate $C^1$. To the upper end of the spindle E is secured a chuck, to which a cutter, $d'$, is secured. Rotary motion in suitable direction is applied to the spindle by a belt from a suitable driving-shaft, J.

The operation is as follows: The article to be provided with a projecting or depressed panel or molding at its surface is in suitable manner secured to the face of a pattern No. 1, Fig. 5. This pattern has a depression or projection of the desired form, as shown. The wood to be cut is now placed upon the table A so that the pattern is on top. The guide-pin is let down into the depressed portion of pattern, the plate $C^1$ resting on the elevated portion of said pattern. The lever G is now depressed to gradually elevate the revolving cutter against the wood, and to cause the same to enter said wood to the requisite depth. Then the cutter is locked by the pawl $h$ at the required height, and the wood and pattern moved by hand over the table in such manner that the pin $C^2$ will be in constant contact with the edge of the projection or depression of pattern. The cutter will thereby be made to cut a molding in the same line as said edge of the pattern. It is thus necessary that the axes of the guide-pin $C^2$ and cutter $d'$ be in line. Instead of having both the guide-pin and the cutter vertically adjustable, but one of them may be so made. Whenever a piece of work has been perforated the lever O is touched to withdraw the cutter therefrom. When edge-molding is required the pin $C^2$ is not needed, and a cutter, of the construction shown in Figs. 2 or 3, placed upon the spindle. This cutter N is mounted or fastened upon a shank or arbor, L, which is locked in a suitable clutch, P. A nut, R, and washers, K, may be used for holding the cutter in place. That part of the arbor L which is under the cutter N serves as a guide for a pattern-plate, whose edge is held against the pattern while the cutter molds the edge of the wood placed on such pattern. For merely cutting a flat plain groove into a board or plate, a cutter like that shown in Fig. 9 may be used, together with the guide-pin $C^2$. Thus the end piece of a pew, shown in Fig. 6, may be grooved, as by dotted lines, to receive the seat and back, while the same machine may also be used to ornament its face, as shown. For molding perforated work at the inner edges I dispense with the cutter on the lower spindle, but place upon the same only a disk or supporting-table, Y, shown in Fig. 10, which may be made vertically adjustable on or with said spindle. In the head $B^2$ a vertical spindle, S, is hung, and provided with a pulley, W, to receive rotary motion from a belt, T. The cutter X, having a projecting pin, $a$, for guiding the cutter in the slots, secured to its lower end, (see Fig. 13,) is placed into the lower end of the spindle S. The said spindle turns loose in a sleeve, $b$, which has a handle, $c$, and a pin, $e$, that project through an inclined slot, $f$, in the lower socket of the head $B^2$. By elevating the sleeve $b$ by means of handle and inclined slot the cutter can be rapidly raised with the spindle, and consequently transferred from one opening to the other of the thing to be molded.

I am aware that extension tops have been made and used for holding open knives, and to fasten by screwing into the tops of spindles, which will allow of revolving only in one direction; and I am aware that short chucks have been made and used for holding different kinds of bits and cutters; but I am not aware that stem-chucks with adjustable rings have ever been made. This style of chuck and fastening allows of the use of double-edged cutters, to revolve in either direction, thereby saving the necessity of having a right-and-left-hand spindle.

Having thus described my invention, I claim as new and desire to secure by Letters Patent—

1. The mechanism consisting of the levers F G, stop $h'$, pawl $h$, and lever O, all arranged for adjusting and locking the vertically-adjustable spindle E, substantially as herein shown and described.

2. A rotary spindle, S, combined, as described, with a head having inclined slot $f$, and a sleeve having handle $c$, and pin $e$, all arranged as and for the purpose specified.

3. The adjusting-screw I, pivoted plate $I'$, and stop $h'$, all combined as described, for the purpose specified.

MYRON T. BOULT.

Witnesses:
GEO. W. MABEE,
ALEX. F. ROBERTS.